United States Patent
Breeden et al.

(10) Patent No.: US 7,702,555 B1
(45) Date of Patent: Apr. 20, 2010

(54) VINTAGE MATURATION ANALYTICS FOR PREDICTING BEHAVIOR AND PROJECTING CASH FLOW FOR CUSTOMER COMMUNITIES AND THEIR RESPONSES TO ECONOMIC, COMPETITIVE, OR MANAGEMENT CHANGES

(75) Inventors: Joseph L Breeden, Santa Fe, NM (US); R David Franklin, Santa Fe, NM (US); Anthony J Giancola, Santa Fe, NM (US)

(73) Assignee: Strategic Analytics, Santa Fe, NM (US)

( * ) Notice: Subject to any disclaimer, the term of this patent is extended or adjusted under 35 U.S.C. 154(b) by 1186 days.

(21) Appl. No.: 09/781,310

(22) Filed: Feb. 13, 2001

Related U.S. Application Data

(60) Provisional application No. 60/184,190, filed on Feb. 22, 2000.

(51) Int. Cl.
*G06Q 40/00* (2006.01)
(52) U.S. Cl. .................... 705/36 R; 705/35
(58) Field of Classification Search .............. 705/36, 705/38, 40, 35, 37, 10, 36 R; 709/703, 203; 707/3, 100
See application file for complete search history.

(56) References Cited

U.S. PATENT DOCUMENTS

| | | | | |
|---|---|---|---|---|
| 5,696,907 A | * | 12/1997 | Tom | 705/38 |
| 5,966,700 A | * | 10/1999 | Gould et al. | 705/38 |
| 6,058,377 A | * | 5/2000 | Traub et al. | 705/36 R |
| 6,070,151 A | * | 5/2000 | Frankel | 705/36 R |
| 6,078,903 A | | 6/2000 | Kealhofer | 705/36 |
| 6,202,053 B1 | | 3/2001 | Christiansen et al. | 705/38 |
| 6,233,566 B1 | * | 5/2001 | Levine et al. | 705/36 R |
| 6,249,775 B1 | | 6/2001 | Freeman et al. | 705/36 |
| 6,405,179 B1 | * | 6/2002 | Rebane | 705/36 R |
| 2001/0032158 A1 | * | 10/2001 | Starkman | 705/36 |

FOREIGN PATENT DOCUMENTS

WO      WO 99/03052     * 1/1999

OTHER PUBLICATIONS

NPL1; "Empirical Othogonal functions", http://en.wikipedia.org/Wiki/Empirical_orthogonal_functions; pp. 1-2.*

(Continued)

*Primary Examiner*—Ella Colbert
(74) *Attorney, Agent, or Firm*—John S. Paniaguas; Katten Muchin Rosenman LLP (57) ABSTRACT

A method predicts vintage behavior. The method receives a first set of data, the first set of data being based on at least one of a first factor and a second factor. The first factor includes a factor related to vintage maturation. The second factor includes a factor not related to vintage maturation. The method determines a second set of data and a third set of data based on the first set of data, the second set of data being based on the first factor, and the third set of data being based on the second factor. The method then predicts vintage behavior based on at least one of the second set of data and the third set of data.

9 Claims, 6 Drawing Sheets

OTHER PUBLICATIONS

NPL2; "Legendre polynomials"; http://en.wikipedia.org/wiki/Legendre_polynomials; pp. 1-7.*

NPL3; http://en.wikipedia.org/wiki/Discrete_Fourier_transform; pp. 1-15.*

Chen, Li-Kanz; "Cost of Issuing Debt: An Analysis of the Factors Affecting the Net Interest Cost of State Bonds"; 1995; University of North Texas; p. 1.*

Bonner, Harrison Douglas, ii; Essays on Money Demand in an Open Economy and Debt Management (Israel, Mexico); The Pennsylvania State University; 1996; p. 1.*

Liu, Shuen-Zen; "Signaling Capital Adequacy Ration Regulations and The Recognition of Loan Impairment by Commercial Banks"; 1993; University of Pittsburgh; p. 1.*

* cited by examiner

VINTAGE MATURATION ANALYTICS FOR PREDICTING BEHAVIOR AND PROJECTING CASH FLOW FOR CUSTOMER COMMUNITIES AND THEIR RESPONSES TO ECONOMIC, COMPETITIVE, OR MANAGEMENT CHANGES

This application claims the benefit of U.S. Provisional Application No. 60/184,190, filed Feb. 22, 2000.

BACKGROUND

1. Field of the Invention

This invention generally relates to the field of management analytics. More particularly, the present invention relates to predicting vintage behavior.

2. Description of Background Information

Businesses have available a wealth of customer account management tools. These tools can suggest the products that a customer is likely to buy, the most valued customers, whether customers will pay their bills on time, whether a customer may have fraudulent intent, or the best time of day for a telemarketer to solicit. These tools manage information at the account level.

Very few tools exist to assist in the management of groups of consumers. Management, however, may need to know how demographic segments of its consumer base will likely evolve over time in terms of their revenue generation, maintenance expense, and credit losses. Today, few businesses know how their own policy decisions, competitive environment, and economic environment impact these aspects of their customer segments.

In certain direct business models, tests may be designed to measure such effects, but many businesses do not have this capability. In the absence of such knowledge, businesses cannot properly target-market to specific customer demographics; balance their products and customer segments for maximum profit and risk management; or hedge their business risks through capital reserves of financial instruments.

Unsatisfactory attempts have been made to perform cash flow and risk management analysis. Banks, for example, have studied the natural maturation of all customers in the average (referred to as "Vintage Analysis" in consumer banking). Banks, however, have not calibrated the behavior of specific vintages to the average or analyzed external effects on consumer behavior. Accordingly, banks, like many businesses, are in need of a tool that may project the impact of policy decisions, competitive environment, and economic environment on their customer segments.

SUMMARY OF INVENTION

In one implementation of the present invention, a method is provided for predicting vintage behavior. The method receives a first set of data, the first set of data being based on at least one of a first factor and a second factor. The first factor includes a factor related to vintage maturation. The second factor includes a factor not related to vintage maturation. The method determines a second set of data and a third set of data based on the first set of data, the second set of data being based on the first factor, and the third set of data being based on the second factor. The method then predicts vintage behavior based on at least one of the second set of data and the third set of data.

DETAILED DESCRIPTION

A vintage, for example, may be a group of customer accounts opened in the same interval of time. Vintages may have an associated age, which is referred to as "months-on-book" in banking. A vintage may be tracked over time. The age of the vintage may be the elapsed time since the account was opened. The behavior of a vintage may then be monitored relative to calendar time or age.

Figure 1:
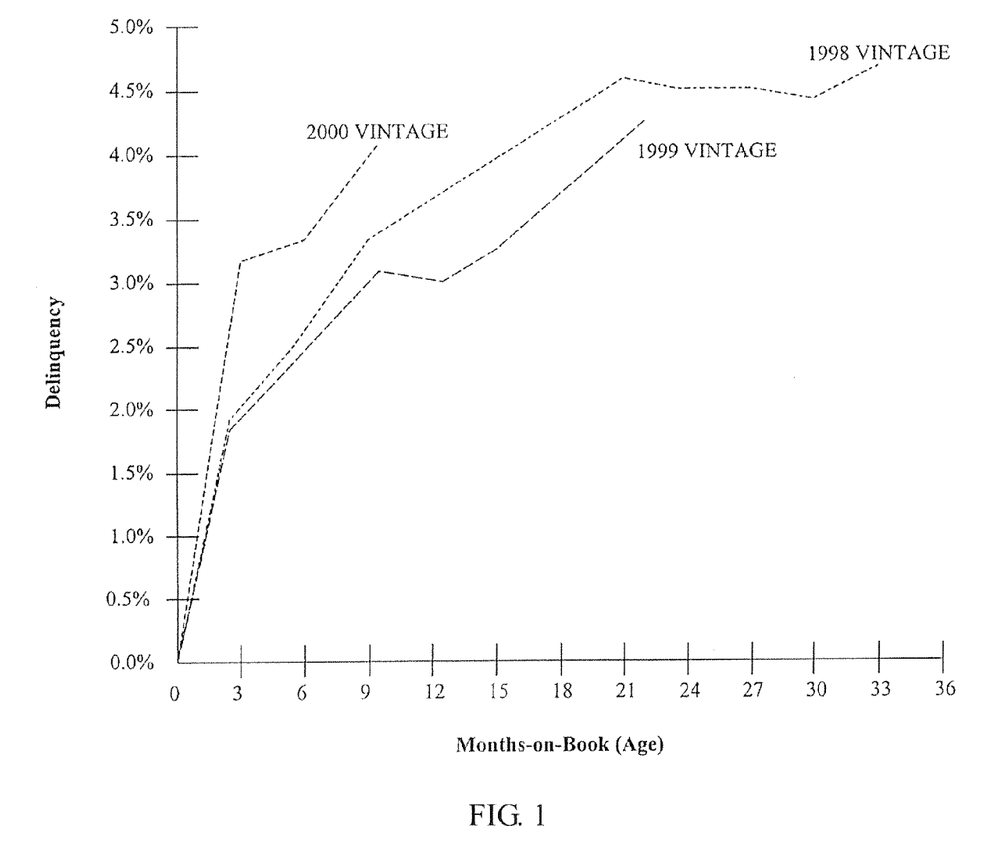
FIG. 1 depicts a vintage curve comparison plot.

Portfolio managers, for example, may have an intuitive understanding of age and time dynamics. Vintage curve plots are used to visually compare vintages to achieve an intuitive understanding of these dynamics. FIG. 1 illustrates three vintage curve plots: a 1998 vintage, a 1999 vintage, and a 2000 vintage. Vintage curve plots, however, may not explain what is being observed. For example, in FIG. 1, is the 2000 vintage performing the worse because the vintage is inherently riskier, or is the economic environment adversely affecting it? Sudden rises or declines in performance, however, may be understood relative to what should have happened under normal conditions.

Measured time series may be composed of multiple signals. For example, vintage behavior may comprise age-based dynamics (or maturation) and time-based dynamics (or external impacts). The dual-time nature of vintage behavior is then valuable information for data analysis on the vintages. Analysis techniques such as Fourier transforms, wavelet transforms, and orthogonal decompositions may be used to decompose a data set into constituents.

In one embodiment of the present invention, a method is provided for analyzing a univariate dual-time series. That is, a method is provided to distinguish and extract age-based and time-based dynamics. Such vintage information may be used to forecast consumer behavior (e.g., consumer loan portfolio behavior).

Figure 2:
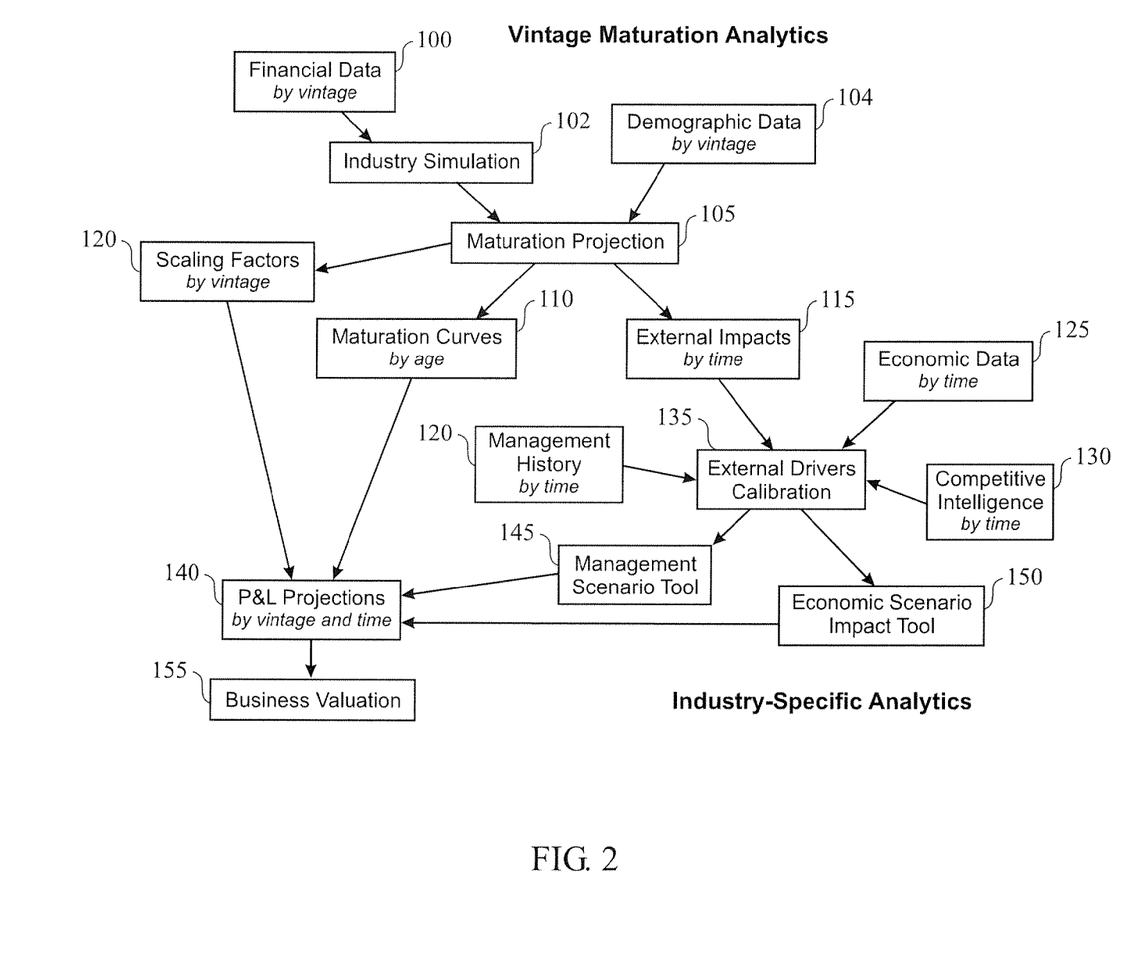
FIG. 2 depicts a flowchart for vintage maturation analytics and industry-specific analytics.

FIG. 2 depicts a method for projecting customer behavior by decomposing data, such as financial data 100, industry simulation 102, and demographic data 104, into components 105, such as a natural maturation (or lifecycle) of an account 110, and impact of external forces 115. The account maturation may be studied as a function of the age of the account by comparing it to other accounts of similar age, for example, by using scaling factors 120. One illustrative example addresses the revenue generated by 18 month old accounts. External impacts 115, including management history 120, economic data 125, and competitive intelligence 130, occur at a specific point in time, and may affect accounts regardless of age. By separating behavior into age-related 110 and time-related 115 effects, drivers of customer behavior may be calibrated 135 to better predict future behavior. The embodiment thus separates age-related 110 and time-related 115 effects, and deviations in behavior from expected to attributes of the account. From this analysis, cash flow projection 140, consumer segment management 145, portfolio balance 150, and risk management problems, described above, may be solved 155.

Thus, the detailed description refers to the accompanying drawings that illustrate embodiments of the present invention. Other embodiments are possible and modifications may be made to the embodiments without departing from the spirit and scope of the invention. Therefore, the detailed description is not meant to limit the invention. Rather the scope of the invention is defined by the appended claims, and their equivalents.

Vintage

An individual account, without more, may not accurately reflect behavioral projections. For example, to determine the probability that a customer will cancel an issued credit card in the seventeenth month may depend upon at least one of when the customer received the credit card (i.e., credit card issued at different times may have different terms), demographic segment of the customer, and geographic location of the customer (i.e., legal constraints vary among states).

Thus, one embodiment analyzes product vintages. A vintage includes a group of people that became customers in the same time interval, such as a day, week, month, quarter, or year. For example, vintages arise in the context of credit cards, where all accounts opened within a le specific month may be referred to as a vintage. For example, the accounts activated in January 2000 may be tracked as a vintage to examine the history of the accounts.

Vintage Maturation

Vintage Maturation refers to the process by which a product vintage changes its behavior over time according to a characteristic lifecycle. For example, if one studied a Jan. 24, 2000 vintage for an online brokerage characteristic patterns may arise. The accounts within that vintage may start as money, which may be deposited or transferred from other accounts. The accounts may then show an initial burst of activity from initial transactions (e.g., investments). The customers presumably would explore the site and learn more of the site's features. As they become more sophisticated investors, the customers may trade more. Over time, the level of usage may stabilize or even drop off. Some attrition may occur. Unsophisticated investors may trade unwisely and be forced to close their accounts. On the other hand, savvy investors may find competing sites with better suited offerings.

Vintage maturation curves may capture these changes in behavior. The vintage maturation curves describe the archetypal development of accounts within a vintage. That is, the curves may not predict the accounts to be affected, but may quantify how the group as a whole may be affected (i.e., a distributional approach).

The vintage maturation curves may be learned by averaging across vintages and determining the structures that are common to all vintages at a given age. These curves may become smoother with increasing age, since the difference between behavior at age N and age N+1 may be small for large N. In high noise, limited data environments, the curves may be approximated using a predefined functional form.

Vintage Maturation Scaling Factors

Multiple vintages may be compared to determine the vintage maturation curves, even though a specific vintage may take a different path because of the difference in the composition of the multiple vintages. To account for such differences, scaling factors 120, as illustrated in FIG. 2, may be used to stretch and shift the curves. The scaling factors 120 may indicate that a specific vintage generates more revenue than average, has lower than average attrition, and/or is more likely to become delinquent. Thus, knowing the scaling factors 120 may improve the estimation of the vintage maturation curves.

External Impacts

External impacts 115, which may affect overall vintage behavior, are events external to the natural vintage maturation. Seasonality, management actions, competitive influences, marketing campaigns, and economic conditions may all contribute to the external impacts curve. Multiple vintages may be time-aligned and compared to quantify the external impacts curve according to a predetermined functional form for the decomposition relative to the maturation curve.

External Impacts Scaling Factors

Vintages may have different magnitude of responses to external impacts based on demographic differences. External impacts scaling factors may calibrate the contribution of individual vintages to the external impacts curve. With sufficient data, separate factors may be used to distinguish vintage response to economics, competition, and a range of management actions.

Scale Factor Correlation to Demographics

Once scaling factors that calibrate the individual vintages to the maturation and external impact curves are learned, patterns in the scaling factors may be determined. That is, by comparing the demographic characteristics of the vintages to their scaling factors, the scaling factors for new vintages may be predicted from their initial demographic profile. Thus, the maturation process and sensitivities for new vintages may be forecast before collecting behavioral data. The predicted scaling factors may then serve as Bayesian priors for estimation of the "true" scaling factors. The Bayesian priors accelerate the convergence of the scaling factors with the addition of new data.

Process

Figure 3:
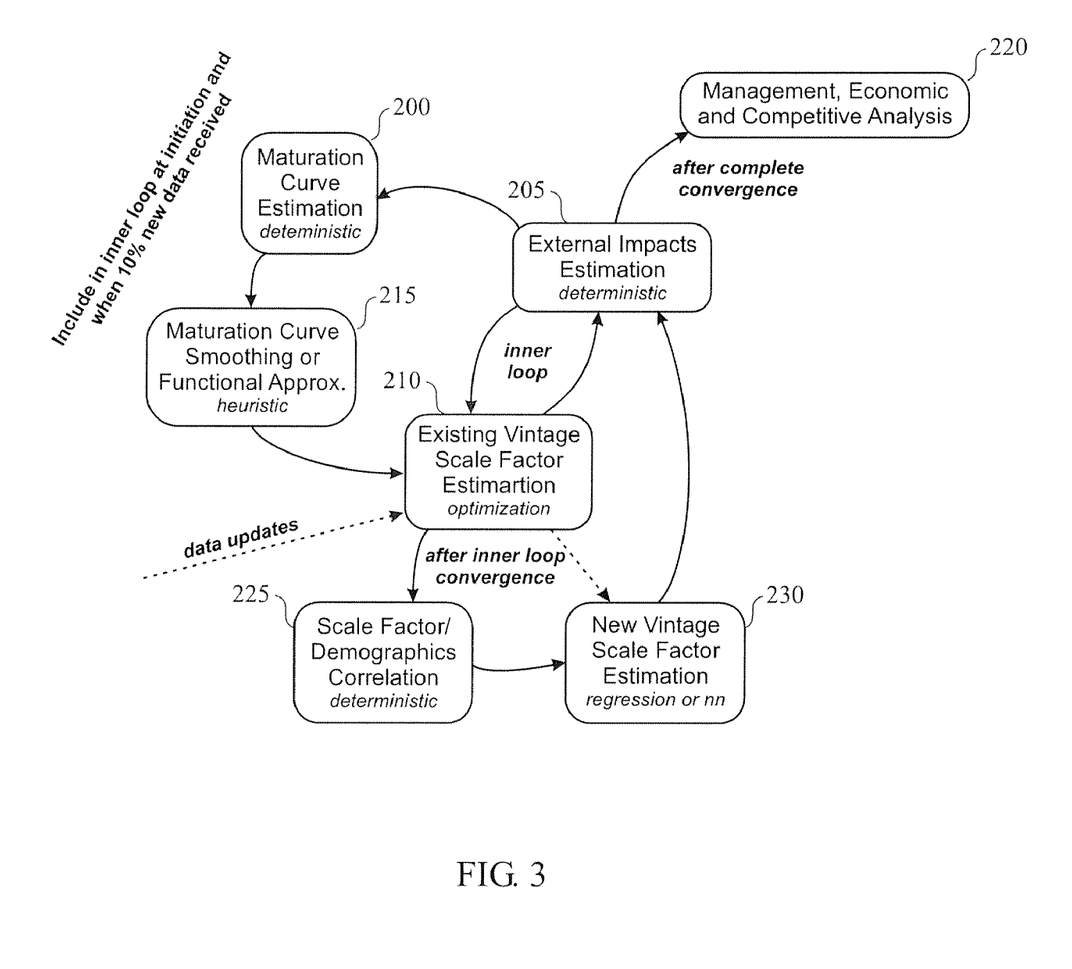
FIG. 3 depicts a flowchart illustrating one embodiment of vintage maturation analytics.

When a new data set is presented to a method for Vintage Maturation Analytics (VMA), the method may iteratively learn at least one of maturation curves 200, external impact curves 205, and vintage-specific scaling factors 210, as shown in FIG. 3. The method may assume that the vintages all have identical scaling factors and there is no external contribution. The method may estimate the maturation curve by averaging the vintage data aligned by age. The maturation curve may then be smoothed 215.

After smoothing, the scaling factors may not be assumed to be uniform. Each vintage may be custom fitted to the maturation curves by estimating the scaling factors. The method may estimate the external impacts curve after the maturation curves and scaling factors.

The estimation of maturation curves, scaling factors, and external impact curves may iterate until all three converge. With limited data sets, smoothing the maturation curve may assure convergence of the method.

External Analysis

When the method converges (i.e., estimates of the maturation curve, scaling factors, and external impact curve are determined), post-processing of the external impact curve may be conducted. Macroeconomic data, management history, and/or competitive intelligence 220 may be used to model the observed structure of the external impact curve. The result being a strategic decision support tool calibrated to project the maturation of the vintages under a broad range of external drivers.

Updates

New data on vintage performance may become available. Incremental data sets may not dramatically affect the maturation curves or the demographic based scale factor prediction models. When new data is added to the data set, the scaling factors for existing vintages may be updated. The scaling factors for new vintages 225 may be predicted based on the demographic profiles. The external impacts curve then may be re-estimated. Minor readjustments may be needed between the scaling factors and external impacts curve. Thus, inner loop may be iterated until it reconverges 230. After convergence, the external analysis may be conducted as described above.

When new data, such as a significant amount of new data, becomes available, the method may adjust the maturation curve and demographic-based scale factor models. The existing curves may be used to seed a new cycle of iterating through at least one of the maturation curve, the scale factor, and the external impacts estimation, such as in the initialization process.

Forecasting

The maturation curves and scaling factors may be combined to project the internally driven cash flow for a product. External impacts may be layered upon these projections based upon at least one of macroeconomic, competitive, and management scenarios. With the demographic-based scale factor models, the method allows a user to specify a target demographic for a marketing campaign to predict the scale factors for new accounts booked as a consequence of that campaign. The method then may include the new accounts in the cash flow projection.

In sum, at initiation, the maturation curves, external impact curves, and scale factors may be learned. After these have converged, the scale factor to demographics correlation and external analyses may be conducted. For each data update, the scale factors and external impacts curves may be re-estimated. When a significant amount of new data becomes available, the maturation curves may be refreshed.

Illustrative Implementation of the Process

The process chooses an appropriate model for the superposition of the age-based and time-based dynamics. Some variables may show separable structure, while others may not. This is analogous to Fourier transforms. Any time series can be run through a Fourier transform, but only time series with frequency-based structure may create a meaningful decomposition. Similarly, consumer portfolio drivers may have separable age/time dynamics. Variables may be restructured to facilitate the decomposition.

In dual-time analysis, decomposition models may be adopted based on the variable to be considered. One illustrative approach assumes superposition occurs additively, similar to how waves on a pond add and subtract.

$$v = f_1(\{\rho_{v,1}\}; \chi_{mat}(age)) + f_2(\{\rho_{v,2}\}; \chi_{ext}(t)) + \epsilon$$

An additive model may be applied to all variables regardless of the range of values. The set of parameters $\{\rho_{v,1}\}$ allows the process to stretch and scale the maturation curve to better fit a specific vintage. The set of parameters $\{\rho_{v,2}\}$ allows the same scaling for the contribution from the external (or exogenous) factors. $\epsilon$ represents the unexplained part of the vintage time series (e.g., noise).

The exogenous factors may also be thought of as an amplifier on the basic maturation behavior. The basic form is of the exogenous factor term serving as a multiplicative amplitude modulation.

$$v = f_1(\{\rho_{v,1}\}; \chi_{mat}(age)) \cdot f_2(\{\rho_{v,2}\}; \chi_{ext}(t)) + \epsilon$$

The multiplicative model, for example, may work for variables in the range $(0, \infty)$. Mixing vintages that may be positive or negative at a given point in time with an exogenous factor that scales towards or away from zero may cause a conflict in the process of decomposition.

The maturation component $f_1(\{\rho_{v,1}\}; \chi_{mat}(age))$, and the exogenous component, $f_2(\{\rho_{v,2}\}; \chi_{ext}(t))$, of the above equations may take on a variety of forms based on the variable to be analyzed. Other models then are also possible. Certain exogenous events may accelerate or delay the maturation process. For the models described in the above equations, the maturation and exogenous factors may be independent. Other illustrative models may include vintage maturation dynamics that may be scaled and exogenous factors that may impact the age scaling.

The functional form of the basis functions (e.g., maturation and/or exogenous curves) at the beginning of the decomposition may be unknown. With Fourier analysis, the basis functions are sines and cosines. Other basis functions such as Legendre polynomials or any orthogonal set of basis functions, however, may be used. In all these implementations, the process of decomposition may be carried out. For consumer dynamics, the basis functions may be nonlinear and specific to the data to be analyzed.

The process of decomposition may possess multiple time series, which may be described by the same maturation and exogenous functions. The multiple time series may have different starting times and scaling parameters. If age=0 occurs at a different time for each series, a temporal shock may be observed at different points in the maturation process for the various time series. The basis functions may then be determined based on structures across the time series that are coincident in either age or time. With this illustrative approach, maturation curves may not need to be retrained when portfolio or environmental shifts occur since the existing curves may not be depended on such trends.

In comparison, maturation curves used in the art are produced by aligning vintage data based on age, and computing an average curve. Rather than explicitly assuming a functional form incorporating exogenous factors, the residuals from the maturation curve are discarded or averaged for studying exogenous factors. This approach, however, creates curves that are not stable with time because of the failure to extract exogenous effects from the maturation curve estimation. With this approach maturation curves then need to be retrained when portfolio or environmental shifts occur since the existing curves are polluted on such trends.

Different vintages may vary based on demographics, even within a consumer segment. That variation may result in different sensitivities to exogenous effects. A simple average of the residuals, as known in the art, does not accurately blend these sensitivities to a signal appropriate for analysis.

The approach used in the art also requires that short, recent data sets be used because of the instability of the curves. This approach, however, is also prone to failure on short data sets. In limited data environments, at least part of the structure that is time-based that should be categorized as exogenous will instead appear as spikes and bumps in the maturation curve. The process of decomposition for VMA, however, is robust even in comparatively poor data sets.

Furthermore, the residuals from the maturation curve used in the art do not allow the flexibility of representation found in the above equations.

When the residuals are then analyzed for seasonality or economic sensitivity, or when the maturation curves are used to make forecasts, the results of the approach used in the art are compromised by the lack of "clean" signals. In sum, an average of residuals does not provide an acceptable approximation of the exogenous curve and does not result in a "clean" decomposition of the maturation and exogenous components of behavior.

VMA, unlike the approach used in the art, decomposes vintage data into maturation driven and externally-driven components. Vintage data may comprise an aggregate of a plurality of accounts.

If for each age, the accounts within the vintage form a roughly uni-modal distribution for a projected variable, then the process may track the mean of the distribution with age to project the future behavior of the vintage. The vintage behavior may be represented functionally as $$X_v(t) = (\alpha_v \chi_{mat}(age) + \beta_v) * \chi_{ext}(t)^{\gamma_v}$$

$$Age = t - t_0 \quad \quad \text{Equation 1}$$

where $\chi_v$ is the mean of the distribution of the vintage variable being decomposed, $\chi_{mat}$ is the average maturation curve for all vintages, $\chi_{ex}$ is the average external impacts curve for all vintages, $t_0$ is when the vintage was initiated, and $\alpha_v$, $\beta_v$ and $\gamma_v$ are vintage-specific scaling factors.

Using the functional form, the maturation curve, $\chi_{mat}$ may then be learned. That is, the maturation curve may be estimated as $$\langle x_{mat}(age) \rangle = \frac{\sum_v \frac{1}{\alpha_v} \left[ \frac{x_v(t)}{x_{ext}(t)^{\gamma_v}} - \beta_v \right] \omega_v}{\sum_v \omega_v} \quad \text{Equation 2}$$

where $\omega_v$, is a weighting factor reflecting the relative importance of the vintages. Illustrative values for $\omega_v$ include the number of accounts within a vintage or the dollar value of the accounts.

After estimating $\chi_{mat}$ for all available ages, the maturation curve may be smoothed and extrapolated to higher ages. Maturation curves tend to saturate to a simple curve for large ages. As such, extrapolation is generally simple to perform.

With $\chi_{mat}$ known and $\chi_{ext}$ either known or set to 1 for all t, the scaling factors $\alpha_{v1}$, $\beta_{v1}$ and $\gamma_v$ may be estimated. Default values may be $\alpha_v = 1$, $\beta_v = 0$, and $\gamma_v = 1$. With sufficient data to smooth the optimization landscape, a simple gradient descent algorithm may be sufficient to find the optimal values. For short data sets, the optimization landscape can become noisier with multiple local optima. A broad variety of evolutionary computation or simulated annealing approaches may then be employed to find a global optimum. A Evolutionary Programming (EP) algorithm provides one approach for this analysis.

The process estimates the external impacts curve by inserting the measured maturation curve into Equation 1 and solving for the external impacts curve. In the uni-modal implementation, this may be computed as $$\langle \ln(x_{ext}(t)) \rangle = \frac{\sum_v \frac{1}{\gamma_v} \ln \left[ \frac{x_v(t)}{\alpha_v x_{mat}(age) + \beta_v} \right] \omega_v}{\sum_v \omega_v} \quad \text{Equation 3}$$

The process further re-estimates the maturation curves. That is, the process iterates until the maturation curves, scaling factors, and external impacts curves converge.

Multi-modal distributions may be modeled by decomposing the data into separate contributions from each mode. The distributional parameters for these subvintages can then be tracked and predicted, similarly to Equations 1-3. Thus, $$\text{dist}_v = \sum_i \text{dist}_{v_i}(c_i) \quad \text{Equation 4}$$

where $c_i$ is a vector of parameters for each sub-distribution.

For multi-modal distributions between $-\infty$ and $\infty$, a process may generally fit the aggregate distribution with multiple Normal distributions and track the means over time, similarly to what was done above. This may occur in credit card revenue where a split may develop between revolvers and transacters.

For multi-modal distributions between 0 and $\infty$, the aggregate distribution may be fit with multiple Gamma distributions and track the shape factors (b, c) with age. The Gamma distribution is $$\text{gammadist}(b, c) = (x/b)^{c-1} \left[ \frac{\exp(-x/b)}{b\Gamma(c)} \right] \quad \text{Equation 5}$$

where $\Gamma(c)$ is the Gamma function $$\Gamma(c) = \int_0^\infty \exp(-u) u^{c-1} du \quad \text{Equation 6}$$

After modeling the vintage maturation process, the external impact curve may be decomposed into its constituents. Modeling the contributions to the external impacts curve, competitive factors, macroeconomic conditions, management actions, etc., is specific to the data items available within an industry and to the specific client. Thus, the process does not restrict the range of analysis in this component.

Illustrative Example of a Consumer Finance Strategic Decision Support

VMA may be applied to manage a consumer loan portfolio. For each loan product (e.g., credit cards, auto loans, mortgages, etc.) a simulation model may be constructed for the cash flow generated by vintages. Within the model, a number of variables to be tracked using VMA are identified. VMA may be applied independently to the variables. In some implementations, however, the variables may be inter-dependent, which may require the simultaneous solution of multiple VMA systems. While more complex, this is a consequence of the VMA approach in real-world applications.

Loan product vintages may be described in terms of

Purchases: consumers may increase their loan balances through new credit charges, cash advances, or balance transfers.

Attrition: consumers who either voluntarily terminate their loan or are forced to close an account due to delinquency. These two effects are generally separated.

Flow Rates: The percentage of accounts (balances) moving from current, through the delinquency buckets, and ultimately to write-off.

The remaining equations are derived from these fundamental effects. The following set of equations provides a description of credit card products.

| | Equation 1: A simple credit card simulation model. |
|---|---|
| Initial accounts | $N(0)$ |
| Voluntary attrition | $\text{attrate}(t) = \dfrac{N(t) - N(t-1) + \text{acct}_{wo}(t)}{N(t-1)} = (a_1 \text{att}_{mat}(\text{age}) + a_2) * \text{att}_{ext}^{a_j}$ |
| Total accounts | $N(t) = N(t-1) * (1 - \text{attrate}(t)) - \text{acct}_{wo}(t)$ |
| Net flows | $\text{flow}_n(t) = (f_{n,1} \text{flow}_{n,max}(\text{age}) + f_{n,2}) * \text{flow}_{n,ext}^{f_{a,3}}$ |
| Product of net flows | $\text{prodflow}_n(t) = \prod_{i=1}^{n} \text{flow}_{n,i}(t - (n-1))$ |
| Delinquent accounts | $\text{acct}_n(t) = N(t - n) * \text{prodflow}_n(t)$ |
| Write-off accounts | $\text{acct}_{wo}(t) = \text{acct}_7(t)$ |
| Current accounts | $\text{acct}_0(t) = N(t) - \sum_{n=1}^{7} \text{acct}_n(t)$ |
| New credit purchases | $\text{newcrdt}(t) = (b_1 \text{newcrdt}_{max}(\text{age}) + b_2) * \text{newcrdt}_{ext}^{b_3}$ |
| New cash purchases | $\text{newcash}(t) = (c_1 \text{newcash}_{max}(\text{age}) + c_2) * \text{newcash}_{ext}^{c_3}$ |
| New transfers | $\text{newtrns}(t) = (d_1 \text{newtrns}_{max}(\text{age}) + d_2) * \text{newtrns}_{ext}^{d_3}$ |
| Payments | $\text{payments}(t) = (e_1 \text{payrate}_{max}(\text{age}) + e_2) * \text{payrate}_{ext}^{e_3} \text{balance}_{tot}(t-1)$ |
| Current Balance | $\text{balance}_0(t) = \text{balance}_0(t-1) - \text{payments}(t) + \text{acct}_0(t) * (\text{newcrdt}(t) + \text{newcash}(t) + \text{newtrns}(t))$ |
| Delinquent Balances | $\text{balance}_n(t) = \text{balance}_0(t - n) * \text{prodflow}_n(t)$ |
| Total Receivables | $\text{totbalance}(t) = \sum_{n=0}^{b} \text{balance}_n(t)$ |
| Gross Credit Loss | $\text{gcl}(t) = \text{balance}_7(t)$ |

The maturation curves ($_{max}$) and external impact curves ($_{ext}$) for voluntary attrition (attrate), new credit purchases (newcrdt), new cash purchases (newcash), new transfers (newtrns), and payment rate (payrate) are all handled as described in Equations 1-3 and FIG 3. The corresponding parameters $\{a_i, b_i, c_i, d_i, e_i; i = 1, 2, 3\}$ are also optimized and related to demographics as shown In FIG 3.

For net account flows and product of net flows, a different approach may be implemented since the product of net flows provides a constraint on the values of the individual net flows. For each age, the value of all the net flows may be learned by minimizing the total error in the net account flows and product of net flows.

$$\varepsilon^2(\text{age}) = \sum_{v,n} (\text{flow}_{v,n}(\text{age}) - \text{actflow}_{v,n}(\text{age}))^2 + \sum_{v,n} (\text{prodflow}_{v,n}(\text{age}) - \text{actprodflow}_{v,n}(\text{age}))^2 \qquad \text{Equation 2}$$

Point-by-point estimation of the net flow maturation curves may be an inherently noisy process. These curves may be smoothed, such as the smoothing increasing for larger ages while satisfying the constraint set by the product of net flows. This may be accomplished using a B-Spline approximation or smoothing with estimated error bars. The individual net flow curves may be approximated with splines, using a data weighting approach where the weight of the points is roughly inverse to the age. The coefficients of the spline fits for all the curves may then be simultaneously optimized to minimize $$\varepsilon^2 = \sum_{age} \varepsilon^2(\text{age}) \qquad \text{Equation 3}$$

This process smoothes the net flow curves while approximately satisfying the constraints set by the product of net flows data. The final adjustment to the curves being that the mean of each maturation curve equals the mean of the underlying data. The rescaling breaks the degeneracy that arises from having vintage-specific scaling factors. Other approaches for breaking the degeneracy may include obvious variations of the above process.

Once the maturation curves are established, the process proceeds to fit the scaling factors. Here again, the scaling factors for the net flows are a special case. For a given vintage, all of the net account flow scaling factors may be optimized simultaneously to avoid violating the constraints set by the product of net flows. To optimize the scaling factors, the process minimizes $$\varepsilon^2(f_{n,1}, f_{n,2}, f_{n,3}) = \sum_{v,n,i} ((\text{flow}_{v,n}(t) - \text{actflow}_{v,n}(t))^2 + (\text{prodflow}_{v,n}(t) - \text{actprodflow}_{v,n}(t))^2) \qquad \text{Equation 4}$$

for each vintage.

After computing the scaling factors, the demographics-based predictions of the scaling factors and the computation of the external impacts curves may be handled approximately as described by Equation 3.

Illustrative Example for Telecommunications

The simulation of companies in the telecommunications industry may be approached similar to the credit card industry. Companies incur high costs acquiring new accounts only to watch those counts attrite again to competitors. VMA is one approach for modeling the internal dynamics of the accounts. The external impacts curves may quantify the impact of changes in competitors, products and/or technology.

The following equations provide one illustrative example of telecommunications simulation, which may be customized for specific companies.

The creation of such a simulation should give telecom companies with powerful capabilities to accurately assess the future value of customers. As a result, the telecom companies may make better decisions regarding corporate mergers, divestitures, capital allocation, and target marketing.

Illustrative Example for Web Site Management

Web site management has many of the same issues as banking. Simulating the evolution of a Web site involves breaking down the various revenue and expense items and projecting the internal dynamics items. Thus, one illustrative example performs a vintage-based analysis on these portfolio items. A set of equations simulate the Web site, and may take the following form:

| | |
|---|---|
| Initial accounts | $N(0)$ |
| Voluntary attrition | $\text{attrate}(t) = \dfrac{N(t) - N(t-1) + \text{acct}_{wo}(t)}{N(t-1)} = (a_1 \text{att}_{mat}(\text{age}) + a_2) * \text{att}_{ext}^{a_j}$ |
| Total accounts | $N(t) = N(t-1) * (1 - \text{attrate}(t)) - \text{acct}_{wo}(t)$ |
| Delinquent flow | $\text{flow}_{30+DPD}(t) = (f_1 \text{flow}_{3+DPD,max}(\text{age}) + f_2) * \text{flow}_{3+DPD,ext}^{f_3}$ |
| Delinquent accounts | $\text{acct}_n(t) = (N(t-1), \ldots, N(t-6)) * \text{flow}_{30+DPD}(t)$ |
| Write-off flow | $\text{flow}_{wo}(t) = (g_1 \text{flow}_{wo,max}(\text{age}) + g_2) * \text{flow}_{wo,ext}^{g_3}$ |
| Write-off accounts | $\text{acct}_{wo}(t) = N(t-7) * \text{flow}(t)$ |
| Current accounts | $\text{acct}_o(t) = N(t) - \text{acct}_{wo}(t)$ |
| New usage | $\text{newuse}(t) = (b_1 \text{newuse}_{max}(\text{age}) + b_2) * \text{newuse}_{ext}^{b_3}$ |
| Service charges | $\text{service}(t) = (c_1 \text{service}_{max}(\text{age}) + c_2) * \text{service}_{ext}^{c_3}$ |
| Current Balance | $\text{balance}_o(t) = \text{acct}_o(t) * (\text{newusage}(t) + \text{service}(t))$ |
| | $\text{balance}_{30+DPD}(t) = \text{acct}_{30+DPD}(t) *$ |
| Delinquent Balances | $\left(\dfrac{1}{6}\sum_{n=1}^{6}(\text{newusage}(t-n) + \text{service}(t-n)) + \text{latefee}\right)$ |
| Total Receivables | $\text{totbalance}(t) = \text{balance}_o(t) + \text{balance}_{30+DPD}(t)$ |
| Gross Credit Loss | $\text{gcl}(t) = \text{acct}_{wo}(t) * (\text{balance}_o(t-7) + 6 * \text{latefee})$ |

In this simulation, attrition (att), delinquent flow (flow$_{30+DPD}$), flow to write-off (flow$_{wo}$), new usage (newuse), and service charges (service) are all decomposed into internal and external components as shown in FIG. 3. The corresponding parameters $\{a_i, f_i, g_i, b_i, c_i; i = 1, 2, 3\}$ are also trained and correlated with demographics as shown in FIG. 3.

| | |
|---|---|
| Internal Expenses | |
| Pages served by category (j) | $\text{pagerate}_j = \text{lowusagedist}_j + \text{highusagedist}_j$ |
| | $= \sum_{n=0}^{\infty} n * \text{binomialdis}(n; b_{1j}, b_{2j}) +$ |
| | $\sum_{n=0}^{\infty} n * \text{binomialdis}(n; b_{3j}, b_{4j})$ |
| Binomial parameters | $b_{ij} = (\beta_{ij1} b_{ij,max} + \beta_{ij2}) * b_{ij,ext}^{\beta_{ij3}}$ |
| Binomial distribution | $\text{binomialdis}(n; b_{1j}, b_{2j}) = \dfrac{b_{1j}!}{n!(n - b_{1j})!} b_{2j}^n (1 - b_{2j})^{b_{1j} - n}$ |

| | |
|---|---|
| Page serving cost | $$servingcost = \sum_j pagerate_j * costperpage_j$$ |
| Total vintage accounts | $$numaccts = \sum_{j,n} binomialdist(n; b_{1j}, b_{2j}) +$$ $$\sum_{j,n} binomialdist(n; b_{3j}, b_{4j})$$ $$= initialaccts$$ |
| Total vintage expenses | totalvintexp = servingcost + maintenancecostperacct * nunaccts |
| External Revenue & Expenses | |
| Content creation | $$contentcost = \sum_{cat} costperpage_{cat} * newpages_{cat}$$ |
| Off-site banner ads | bannercost = costperbanner * numbanners |
| Direct mail | mailcost = costpermailer * nummailers |
| Total Expenses | totalexp = servingcost + contentcost + bannercost + mailcost |
| Internal Revenue | |
| Ad clicks per page view | adclicks = $(a_1 adclicks_{max}(age) + a_2) * adclicks_{ext}{}^{a3}$ |
| Fees by category(j) | $fees_j = (c_1 fees_{j,max}(age) + c_2) * fees_{j,ext}{}^{c3}$ |
| Merchandise purchases | purchases = $(d_1 purchases_{max}(age) + d_2) * purchases_{ext}{}^{d3}$ |
| Total revenue | $$revenue = purchases + \sum_j adclicks * pagerate_j + fees_j$$ |

For Web site simulation, the equations related to the natural internal dynamics of the community and the external revenue and expenses may be separated. The equations regarding external revenue and expenses may be listed as expense items; but they may impact upon the revenue generated from the community. This relationship may be revealed by comparing the external actions to the external impacts curves obtained via the dynamic analysis.

In modeling the internal dynamics, the rate at which pages are served may be broken into high-use and low-use user segments. The process may be similar to that described above in Equations 4-6 of section regarding "Illustrative Implementation of the Process." In this illustrative example, the distribution is over integers (i.e., no fractions of a page are measured). Thus, the problem of decomposing a non-negative distribution from Gamma distributions may be simplified to simple binomial distributions. The parameters of the binomial distributions may then be separated into internal and external dynamics through the process described in Equations 1-3 of said section. Alternatively, a simpler model for these parameters may also be acceptable.

In the equations regarding internal revenue, advertising click-throughs (adclicks), fees (fees), and purchases (purchases) and their corresponding parameters $\{a_I, c_I, d_I, I=1,2, 3\}$ may be modeled also as described in Equations 1-3.

The result comprising a detailed internal model for the evolution of the Web site's user community, and a set of external impacts curves for pagerate, binomial parameters {biji=1,2,3; j=1, . . . , number of categories}, adclicks, fees, and purchases. The effect of new policies, product offerings, competitors, and/or economics may then be determined.

Web sites may use other metrics for the customer/Web site that management targeted as a proxy for future revenue generation potential. These metrics may also be included within this implementation with minimal changes.

Illustrative Example for Predicting Vintage Behavior

Figure 4:
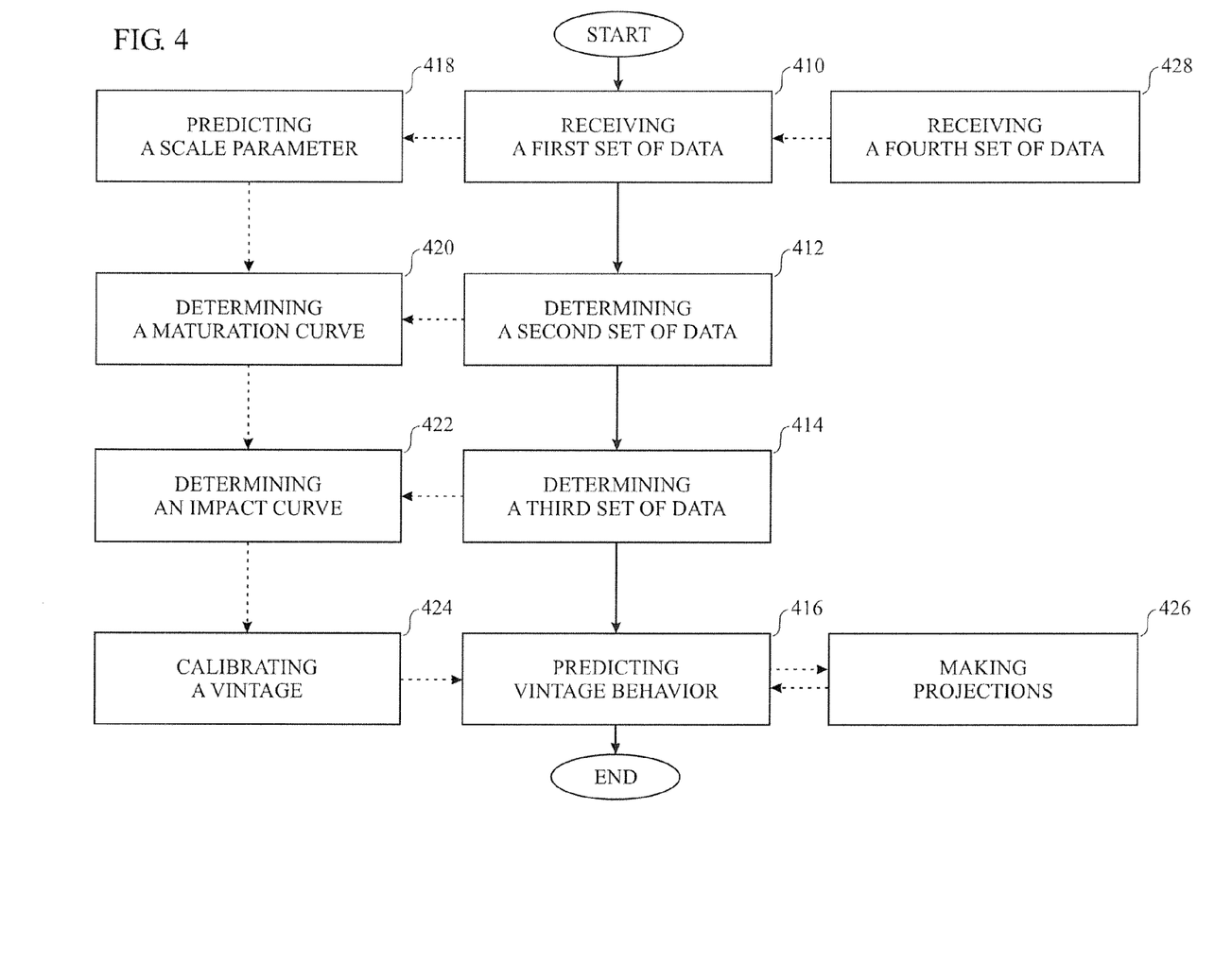
FIG. 4 depicts one embodiment of a method for predicting vintage behavior

FIG. 4 illustrates one implementation of a method 400 for predicting vintage behavior. In block 410, the method 400 receives a first set of data, the first set of data being based on at least one of a first factor and a second factor. The first factor may include a factor related to vintage maturation. Also, the first factor may include a factor based on age dynamics of the first set of data. The second factor may include a factor not related to vintage maturation. Also, the second factor may include a factor based on time dynamics of the first set of data. Moreover, the second factor may include a factor based on one of seasonality, market competition, management policy, consumer environment and economic environment. Further, the second factor may include a factor based on noise. The first set of data may include vintage data (e.g., economic data). The method 400 may predict a scaling parameter based on the first set of data, as shown in block 418.

In block 412, the method 400 determines a second set of data based on at least one of the first set of data and the first factor. The method 400 may determine a maturation curve based on the second set of data, as shown in block 420.

In block 414, the method 400 determines a third set of data based on at least one of the first set of data and the second factor. The method 400 may determine an impact curve based on the third set of data, as shown in block 422. The impact curve may include an economic component.

The method 400 may use a functional form to extract the maturation curve and/or the impact curve, the maturation curve being based on the second set of data, and the impact curve being based on the third set of data. The method 400 may use an additive functional form, and/or a multiplicative functional form. The method 400 may also calibrate a vintage, which may be based on the first set of data, to at least one of the maturation curve and the impact curve based on the scaling parameter, as shown in block 424.

In block 416, the method 400 then predicts vintage behavior based on at least one of the second set of data, the third set of data, and the scaling parameter. The method 400 may make projections of at least one of a management event, a competitive event and an economic event based on the prediction of vintage behavior, as shown in block 426. The prediction of vintage behavior may quantify the effect of the second factor on vintage maturation. Also, the prediction of vintage behavior may include a model of economic sensitivity of consumers, which may be based on the economic data and the economic component of the impact curve.

The method 400 may receive a fourth set of data to update the prediction of vintage behavior, as shown in block 428, the fourth set of data being based on at least one of the first factor and the second factor. The fourth set of data may be based on a scenario to be forecasted, the scenario to be forecasted including at least one of a management event, a competitive event and an economic event. The method 400 may predict a scaling parameter based on the fourth set of data. The method 400 may (re)determine the second set of data based on at least one of the fourth set of data and the first factor, as shown in block 412. The method 400 may (re)determine the second set of data based on the amount of data in the fourth set of data. The method 400 may then (re)determine the third set of data based on at least one of the fourth set of data and the second factor, as shown in block 414. The method 400 may then update the prediction of vintage behavior based on at least one of the second set of data, the third set of data, and the scaling parameter, as shown in block 416.

Figure 5:
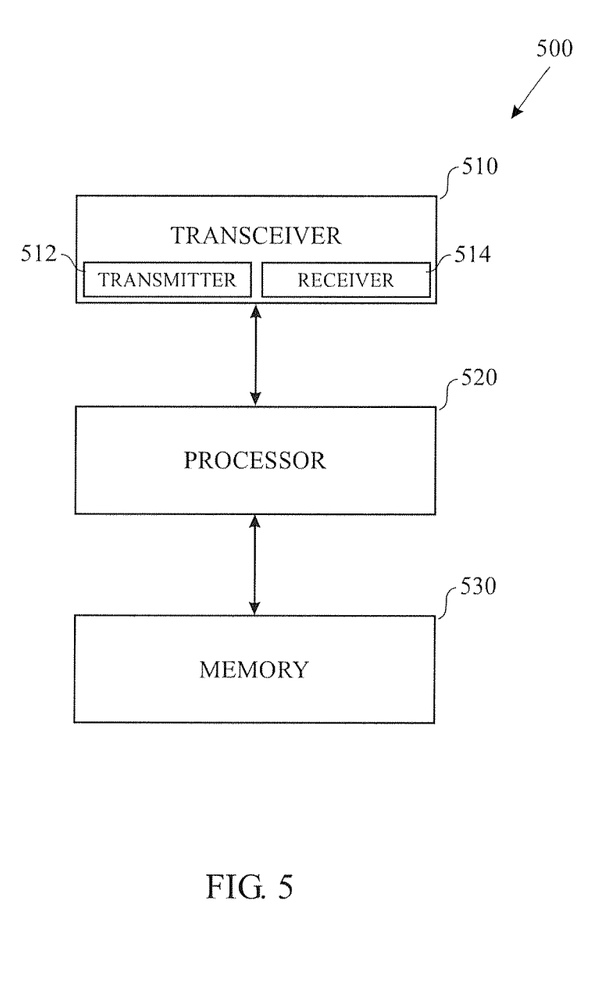
FIG. 5 depicts one embodiment of an apparatus for predicting vintage behavior.

FIG. 5 illustrates one implementation of an apparatus 500 for predicting vintage behavior. The apparatus 500 comprises a transceiver 510, a processor 520, and memory 530. The transceiver 510 includes a transmitter 512 that allows the apparatus 500 to transmit information, for example, to a network (not shown) over a communications link (not shown). The transceiver 510 also includes a receiver 514 that allows the apparatus 500 to receive information, for example, from the network over the communications link. Such transmission and reception operations over the communications link may be conducted using the same or different data rates, communications protocols, carrier frequencies, and/or modulation schemes. Likewise, the operations and/or circuit configurations of the transmitter 512 and the receiver 514, respectively, may be completely independent of one another or, alternatively, may be partially or fully integrated.

The processor 520, which may comprise one or more microprocessors, microcontrollers, or other arrays of logic elements, controls the operation of the apparatus 500 according to a sequence of commands that may be (A) stored in the memory 530 or in another storage device within or coupled to the apparatus 500, (B) entered by a user through an interface such as a data entry device (i.e., a keypad) (not shown), and/or (C) received from the network over the communications link.

Figure 6:
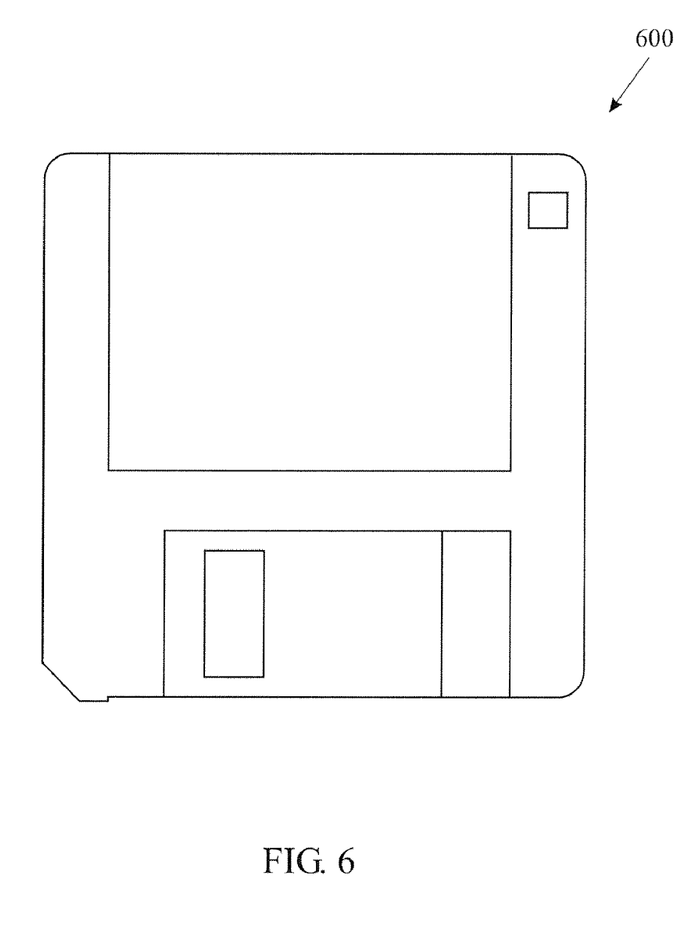
FIG. 6 depicts one embodiment of a machine-readable medium encoded with a program, which when executed by a machine causes a method for predicting vintage behavior.

The memory 530, which may comprise read-only memory (ROM), random-access memory (RAM), nonvolatile memory, an optical disk, a magnetic tape, and/or a magnetic disk, stores programmable parameters and may also store information including executable instructions, non-programmable parameters, and/or other data. For example, vintage information may be stored in the memory 530 and/or may be stored elsewhere within the apparatus 500. Executable instructions defining a method associated with the presented embodiments may also be stored in the memory 530 for execution by the processor 520. The method may be programmed when the apparatus 500 is manufactured or via a machine-readable medium 600 (e.g., see FIG. 6) at a later date. Such a medium may include any of the forms listed above with respect to the memory 530 and may further include, for example, a carrier wave modulated, or otherwise manipulated, to convey instructions that can be read, demodulated/decoded and executed by the apparatus 500.

In view of the foregoing, it will be apparent to one of ordinary skill in the art that the described embodiments may be implemented in software, firmware, and hardware. The actual software code or specialized control hardware used to implement the present invention is not limiting of the invention. Thus, the operation and behavior of the embodiments is described without specific reference to the actual software code or specialized hardware components. The absence of such specific references is feasible because it is clearly understood that artisans of ordinary skill would be able to design software and control hardware to implement the embodiments of the present invention based on the description herein.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile memory or a software program loaded from or into a data storage medium as machine-readable code, such code being instructions executable by an array of logic elements such as a microprocessor or other digital signal processing unit, or some other programmable machine or system. As such, the present invention is not intended to be limited to the embodiments shown above, any particular sequence of instructions, and/or any particular configuration of hardware but rather is to be accorded the widest scope consistent with the principles and novel features disclosed in any fashion herein.

What is claimed is:

1. A data processing method for automatically processing and analyzing vintage loan performance data in order to predict a behavior of a group of vintage loan accounts, the data processing method comprising the steps of:
    (a) storing vintage loan performance data representative of a known group of vintage loan accounts in a memory device;
    (b) processing said known vintage loan performance data stored in said memory device by way of a processor in order to automatically decompose said known vintage loan performance data into an age based component and calendar time based component; and
    (c) forecasting the behavior of said vintage loan accounts based upon said age component and said calendar time component.

2. The data processing method as recited in claim 1, wherein step (b) comprises decomposing said vintage loan performance data into said age component and said calendar time component, wherein said calendar time component is based upon one or more exogenous effects.

3. The data processing method as recited in claim 2 wherein step (b) comprises decomposing said vintage loan performance data into said age component and said calendar time component, wherein said calendar time component is based upon seasonal effects.

4. The data processing method as recited in claim 2 wherein step (b) comprises decomposing said vintage loan performance data into said age component and said calendar time component, wherein said calendar time component is based upon management actions.

5. The data processing method as recited in claim 2 wherein step (b) comprises decomposing said vintage loan performance data into said age component and said calendar time component, wherein said calendar time component is based upon competitive influences.

6. The data processing method as recited in claim 2 wherein step (b) comprises decomposing said vintage loan performance data into said age component and said calendar time component, wherein said calendar time component is based upon marketing campaigns.

7. The data processing method as recited in claim 2, wherein step (b) comprises decomposing said vintage loan performance data into said age component and said calendar time component, wherein said calendar time component is based upon economic conditions.

8. The data processing method as recited in claim 2 wherein step (b) comprises decomposing said vintage loan performance data into said age component and said calendar time component, wherein said calendar time component is based upon management history.

9. The data processing method as recited in claim 2, step (c) includes the step of determining the demographic characteristics of said past loan accounts in order to predict the future performance of said vintage loan accounts.

* * * * *